(12) United States Patent
Lynch

(10) Patent No.: US 8,756,322 B1
(45) Date of Patent: Jun. 17, 2014

(54) FULFILLMENT OF REQUESTS FOR COMPUTING CAPACITY

(75) Inventor: Nicholas J. Lynch, Seattle, WA (US)

(73) Assignee: Amazon Technologies, Inc, Reno, NV (US)

( * ) Notice: Subject to any disclaimer, the term of this patent is extended or adjusted under 35 U.S.C. 154(b) by 29 days.

(21) Appl. No.: 13/161,578

(22) Filed: Jun. 16, 2011

(51) Int. Cl.
*G06F 15/173* (2006.01)
*H04L 12/54* (2013.01)

(52) U.S. Cl.
CPC .................. *H04L 12/5695* (2013.01)
USPC .......................... 709/226; 709/228

(58) Field of Classification Search
USPC ................................. 709/226, 228
See application file for complete search history.

(56) References Cited

U.S. PATENT DOCUMENTS

| | | | | |
|---|---|---|---|---|
| 2003/0101213 | A1* | 5/2003 | Wright | 709/203 |
| 2011/0138055 | A1* | 6/2011 | Daly et al. | 709/226 |

OTHER PUBLICATIONS

U.S. Appl. No. 12/397,890, filed Mar. 4, 2009 for "Non-Binding Placement of Inventory in a Materials Handling Facility".
U.S. Appl. No. 11/847,735, filed Aug. 30, 2007 for "Optimization of Packaging Sizes".
Cohen, et al., "An Efficient Approximation for the Generalized Assignment Problem", Department of Computer Science Technion, Haifa 32000, Israel, pp. 1-8.

* cited by examiner

*Primary Examiner* — Adnan Mirza
(74) *Attorney, Agent, or Firm* — Thomas|Horstemeyer, LLP

(57) ABSTRACT

Disclosed are various embodiments related to the fulfillment of requests for computing capacity. In one embodiment, a request queue includes requests from customers for computing resources to be allocated. Individual ones of the computing resources are allocated to individual ones of the customers based at least in part on requested availability times, device parameters, and at least one allocation rule. Another request for allocating a computing resource for a first customer is added to the request queue. At least one computing resource from a second customer is reallocated to the first customer in response to the other request.

25 Claims, 4 Drawing Sheets

200

FULFILLMENT OF REQUESTS FOR COMPUTING CAPACITY

BACKGROUND

Web services and/or other applications consume computing resources. Such computing resources are provided through a hardware architecture that is often maintained by another entity. The entity may correspond to an in-house computing resource department or to an external hosting provider. The computing resources consumed by web services and/or applications may change over time. Thus, the web services and/or applications may require additional hardware.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to fulfilling requests for computing capacity. Various customers, service owners, and other computing resource users may submit requests for additional networked computing capacity. The computing capacity may be available on an enterprise network or a public network, and the customers may be internal customers or external customers. The requests may be associated with differing priorities and capacity parameters. Such requests may be submitted manually and fulfilled manually, but it may be difficult to track the various requests and to ensure that all the parameters relating to the requests are properly considered.

Various embodiments of the present disclosure facilitate a rule-based allocation of computing capacity in response to multiple requests. Various parameters of the requests may be considered according to one or more allocation rules. For example, a request may specify a time at which the capacity is requested to be available, one or more computing device related parameters (e.g., disk space, computing platform, etc.), one or more location parameters (e.g., location within a data center), and/or other parameters. The request may also be associated with a priority. A computing resource such as a server or a virtual machine instance may be allocated in response to the request. The allocation may be late-binding such that the computing resource may be reallocated for higher priority requests in some cases. In the following discussion, a general description of the system and its components is provided, followed by a discussion of the operation of the same.

Figure 1:
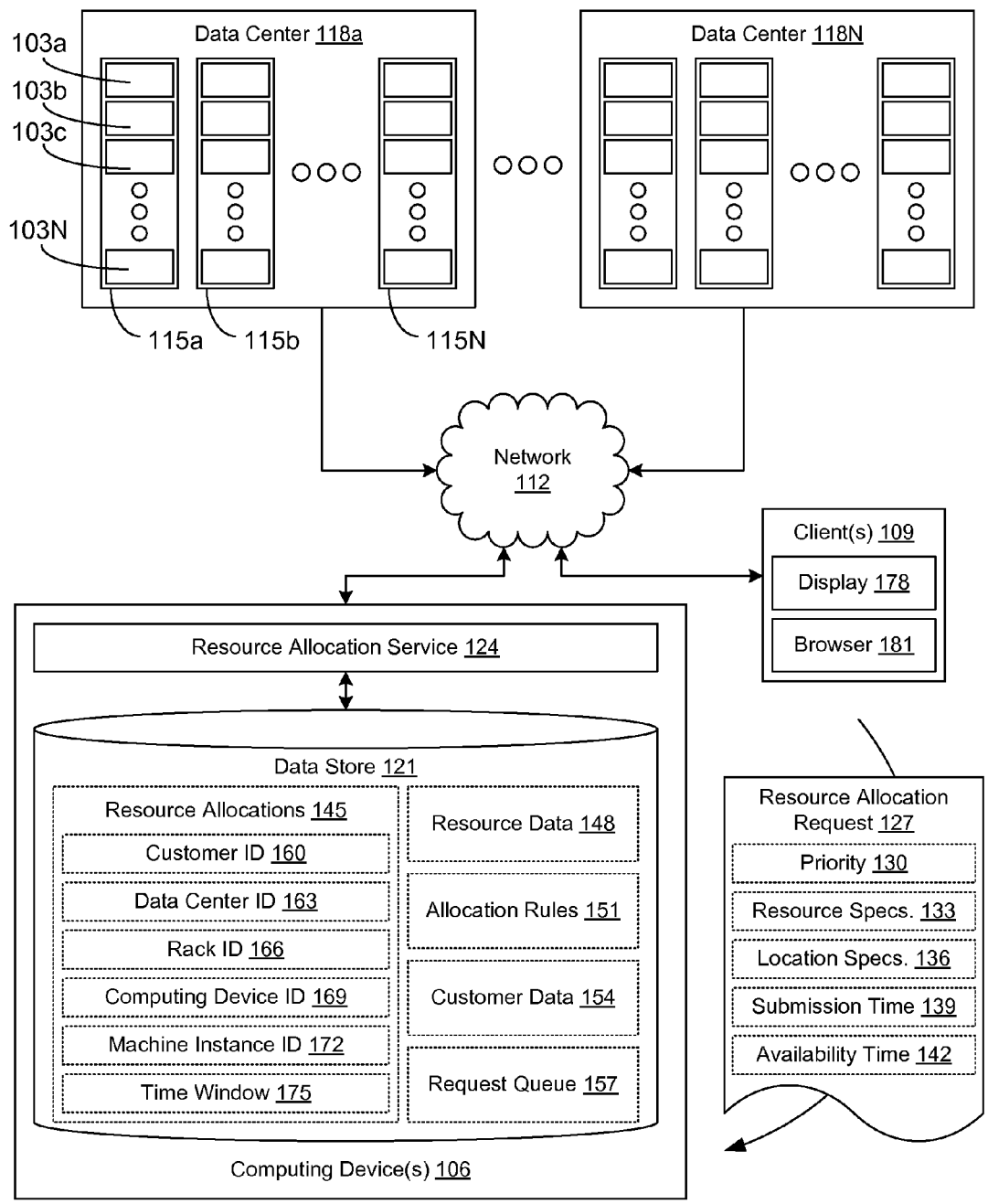
FIG. 1 is a drawing of a networked environment according to various embodiments of the present disclosure.

With reference to FIG. 1, shown is a networked environment 100 according to various embodiments. The networked environment 100 includes a plurality of computing devices 103a, 103b, 103c . . . 103N, one or more computing devices 106, and one or more clients 109 in data communication by way of a network 112. The network 112 includes, for example, the Internet, intranets, extranets, wide area networks (WANs), local area networks (LANs), wired networks, wireless networks, or other suitable networks, etc., or any combination of two or more such networks.

Each computing device 103 may comprise, for example, a server computer or any other system providing computing capability. The computing devices 103 may be arranged, for example, in one of a plurality of racks 115a, 115b . . . 115N, compute clusters, server banks, computer banks or other arrangements. Although the term "rack" is used herein, rack 115 may also correspond to shelves, spaces, and or any other space arrangements for the computing device 103. For example, a plurality of computing devices 103 together may comprise a cloud computing resource, a grid computing resource, and/or any other distributed computing arrangement. The computing devices 103 may be distributed among a plurality of data centers 118a . . . 118N, which may be in multiple geographic locations. In some cases, multiple data centers 118 may be in a single geographic location but with different network 112 connections, different power redundancy, and/or other different characteristics that may affect availability. For purposes of convenience, the computing device 103 may be referred to herein in the singular. Even though the computing device 103 may be referred to in the singular, it is understood that a plurality of computing devices 103 may be employed in the various arrangements as described above.

Various applications and/or other functionality may be executed in the computing device 103 according to various embodiments. Also, various data is stored in a data store that is included in or otherwise accessible to the computing device 103. In one embodiment, the entire computing device 103 may be allocated to a customer. In another embodiment, the computing device 103 may be allocated for the use of multiple customers in the form of multiple virtual machine instances executed in the computing device 103. The customer may retain use of the computing device 103 indefinitely or for a fixed period of time according to the allocation. The customer may elect to relinquish use of the computing device 103 at a future time in some configurations.

The computing device 106 may comprise, for example, a server computer or any other system providing computing capability. Alternatively, a plurality of computing devices 106 may be employed that are arranged, for example, in one or more server banks or computer banks or other arrangements. For example, a plurality of computing devices 106 together may comprise a cloud computing resource, a grid computing resource, and/or any other distributed computing arrangement. Such computing devices 106 may be located in a single installation or may be distributed among many different geographical locations. For purposes of convenience, the computing device 106 is referred to herein in the singular. Even though the computing device 106 is referred to in the singular, it is understood that a plurality of computing devices 106 may be employed in the various arrangements as described above.

Various applications and/or other functionality may be executed in the computing device 106 according to various embodiments. Also, various data is stored in a data store 121 that is accessible to the computing device 121. The data store 121 may be representative of a plurality of data stores 121 as can be appreciated. The data stored in the data store 121, for example, is associated with the operation of the various applications and/or functional entities described below.

The components executed on the computing device 106, for example, include a resource allocation service 124 and other applications, services, processes, systems, engines, or functionality not discussed in detail herein. The resource allocation service 124 is executed to obtain resource allocation requests 127 from clients 109 and to allocate resources of the computing devices 103 to customers in response to the resource allocation requests 127. The allocations may be performed according to a rule set that takes into account various parameters that are associated with the resource allocation requests 127. Until the computing capacity is needed by the customer, such allocations may be considered tentative or pending. Thus, in some embodiments, computing capacity that has been tentatively allocated to customers may be reallocated to other customers with higher priority resource allocation requests 127 or resource allocation requests 127 that are otherwise a better fit for the computing devices 103 that provide the computing capacity according to the allocation rule set.

Each resource allocation request 127 may specify, or be associated with, a priority 130, resource specifications 133, location specifications 136, a submission time 139, and an availability time 142. The priority 130 indicates a priority to be given to the resource allocation request 127 by the resource allocation service 124 relative to other resource allocation requests 127 in allocating computing resources. Such a priority 130 may be customer-specified within the resource allocation request 127 or assigned to the resource allocation request 127 by the resource allocation service 124 according, for example, to the identity of the customer, the intended use of the allocation specified by the customer, the ease of fulfilling the resource allocation request 127, and/or other factors.

The resource specifications 133 may include one or more parameters relating to a type of computing device 103 and/or a virtual machine instance that is requested. Such resource specifications 133 may be marked mandatory, optional, preferred with a specified strength of preference, etc. In various cases, the resource specifications 133 may relate to memory, processor and/or other hardware requirements. The resource specifications 133 may also relate to data storage characteristics, a type of operating system, network 112 connection requirements, power availability requirements, a desired virtual machine instance configuration, and/or other specifications. The resource specifications 133 may also indicate a predicted memory/processor usage pattern for the respective computing resource by the respective customer, such as, for example, whether the customer intends to use the computing resource for I/O-bound tasks, compute-bound tasks, graphics-rendering-bound tasks, and so on.

The location specifications 136 may include one or more parameters relating to a location of computing device 103 and/or a virtual machine instance that is requested. Such location specifications 136 may be marked mandatory, optional, preferred with a specified strength of preference, etc. In various cases, the location specifications 136 may specify a particular data center 118, an availability zone with separate resource availability, a compute cluster, a rack location, a distribution among locations, and/or other locations with varying degrees of granularity.

In some situations, a customer may specify a minimum distance from one or more other allocated computing resources of the customer within the same data center 118, rack 115, or other hosting environment. For example, the customer may wish to isolate potential causes of failure that may affect a rack 115, server room, etc. By contrast, in other situations, a customer may specify a maximum distance from one or more other allocated computing resources of the customer. For example, the customer may wish to minimize data transmission latency and/or increase available bandwidth among the allocated computing resources of the customer. In some situations, a customer may specify a distribution of the computing resources of the customer among some or all of the data centers 118. For example, a customer may wish to have its computing resources evenly distributed among all of the data centers 118 on the west coast, or a customer may wish to have two-thirds of its computing resources evenly distributed among all of data centers 118 in the United States.

The submission time 139 indicates when the resource allocation request 127 was submitted by the customer. The submission time 139 may be used by the resource allocation service 124 to prioritize earlier-submitted resource allocation requests 127. The availability time 142 indicates when the customer expects to have use of the requested computing resource. In one embodiment, the availability time 142 may be accompanied by a tolerance that indicates a delay that the customer is willing to accept in the computing resource being made available. In various embodiments, the resource allocation request 127 may also specify a price that the customer is willing to pay for the computing resource, tolerances for substitutions, allocation durations, and/or other parameters.

The data stored in the data store 121 includes, for example, a plurality of resource allocations 145, resource data 148, allocation rules 151, customer data 154, a request queue 157, and potentially other data. The resource allocations 145 correspond to the allocation of computing resources from the computing devices 103 to various customers. To this end, each resource allocation 145 may include a customer identifier 160, a data center identifier 163, a rack identifier 166, a computing device identifier 169, a machine instance identifier 172, a time window 175, and/or other data. The resource allocations 145 may also indicate a current state of the allocation, e.g., whether the allocation has been implemented, whether the hardware and space exist, whether the software has been configured, whether the allocation is pending, etc.

The customer identifier 160 corresponds to the customer, service owner, or other entity for which the resource is allocated. The data center identifier 163 corresponds to the data center 118, availability zone, or other geographic arrangement where the resource is allocated. The rack identifier 166 corresponds to a rack 115, room, compute cluster, or other sub-portion of a data center 118 or other geographic arrangement where the resource is allocated.

The computing device identifier 169 specifies a computing device 103 that is allocated or partially allocated to the customer. The computing device identifier 169 may be correlated with other data that identifies the hardware, software, and/or other features of the particular computing device 103. The machine instance identifier 172 may specify a virtual machine instance that is allocated to a customer on the computing device 103 identified by the computing device identifier 169. The machine instance identifier 172 may be correlated with other data that identifies the software and/or other features of the particular virtual machine instance.

The time window 175 may indicate a duration for the resource allocation 145. Although some resource allocations 145 may be for an indefinite duration, other resource allocations 145 may be for a specific duration after which resource allocation 145 may expire. After expiration of the resource allocation 145, the associated computing capacity may be reallocated. In some cases, the space in the data center 118 may be replaced with different computing device(s) 103 after the resource allocation 145 expires.

The resource data 148 includes various data describing the configurations of the computing devices 103, the racks 115, the data centers 118, virtual machine instance configurations, and so on. The resource data 148 may also specify computing devices 103 and/or other resources that are forecasted to become available by a certain time. The allocation rules 151 include one or more rules that are applied in evaluating the resource allocation requests 127. The allocation rules 151 may, for example, specify weights, formulas, and/or other rules for processing priorities 130, resource specifications 133, location specifications 136, submission times 139, availability times 142, etc. in order to determine whether to make an allocation in response to the request, and if so, where, with what hardware, etc.

The customer data 154 may include various data about the customer such as, for example, billing information, associated services operated by the customer, existing and pending allocations of computing resources, stored preferences, usage profiles, and/or other data. The request queue 157 includes a plurality of resource allocation requests 127. In one embodiment, the request queue 157 may be implemented as a priority queue. The request queue 157 may be processed periodically to update allocations for resource allocation requests 127 that are still pending and have not been finalized. In some cases, the underlying computing capacity may be reallocated from a pending resource allocation 145 of a resource allocation request 127 to another resource allocation request 127 of the same customer or a different customer.

The client 109 is representative of a plurality of client devices that may be coupled to the network 112. The client 109 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 109 may include a display 178. The display 178 may comprise, for example, one or more devices such as cathode ray tubes (CRTs), liquid crystal display (LCD) screens, gas plasma-based flat panel displays, LCD projectors, or other types of display devices, etc.

The client 109 may be configured to execute various applications such as a browser 181 and/or other applications. The browser 181 may be executed in a client 109, for example, to access and render network pages, such as web pages, or other network content served up by the computing device 106 and/or other servers, thereby generating a rendered network page on the display 178. The client 109 may be configured to execute applications beyond browser 181 such as, for example, a special-purpose application for interacting with the computing device 106, service clients for services hosted through the computing devices 103, email applications, instant message applications, and/or other applications.

Figure 2:
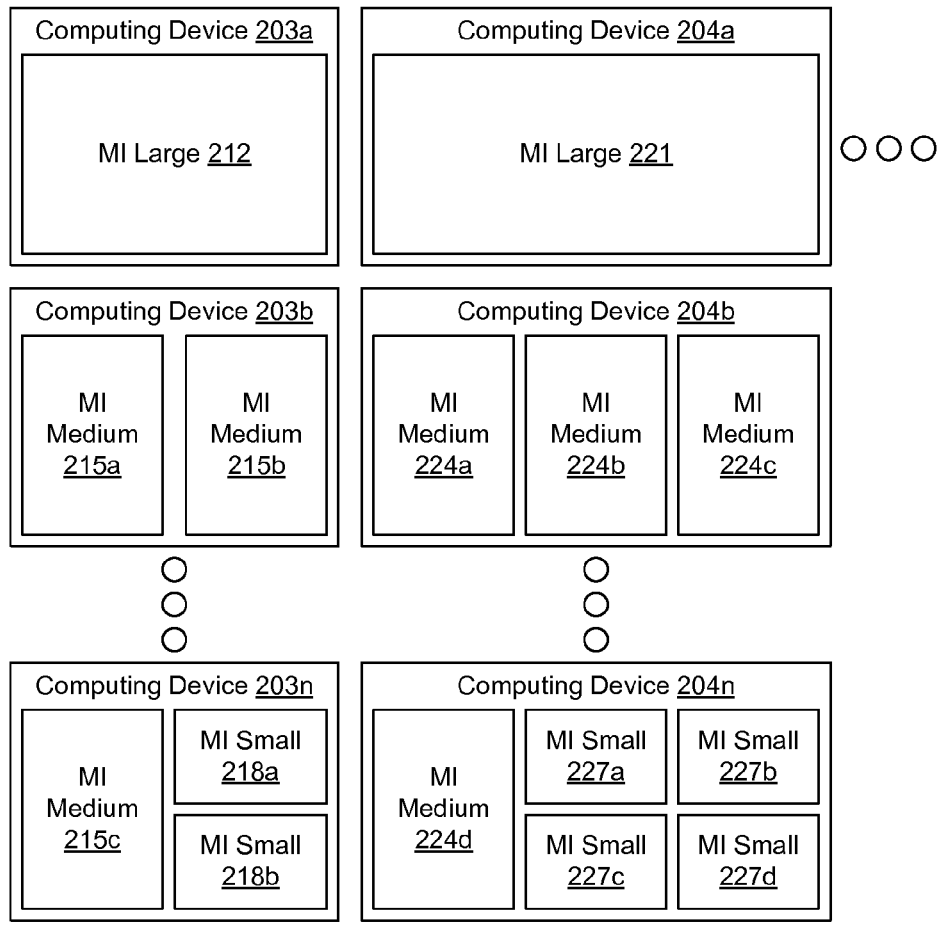
FIG. 2 is a drawing of an example of various computing resources that may be employed in the networked environment of FIG. 1 according to various embodiments of the present disclosure.

Referring next to FIG. 2, shown is a diagram 200 illustrating an example of various computing devices 103 (FIG. 1) that may be employed in the networked environment 100 (FIG. 1) according to various embodiments. The diagram 200 includes a plurality of computing devices 203a, 203b . . . 203n and a plurality of computing devices 204a, 204b . . . 204n. Each of the computing devices 203, 204 may correspond to computing devices 103 from FIG. 1. The computing devices 203, 204 may be in data communication with each other and/or other computing devices 106 (FIG. 1) by way of a network 112 (FIG. 1).

Computing devices 203 and 204 may correspond to differing hardware platforms in various embodiments. Accordingly, computing devices 203 and 204 may have differing hardware configurations of resources, for example, of central processing units (CPUs) that provide general-purpose processing resources, graphics processing units (GPUs) that provide graphics processing resources, system memory, data storage characteristics such as capacity, storage bandwidth, and storage input/output operations per second (IOPS), network bandwidth, and/or other hardware characteristics. In one embodiment, all computing devices 203a, 203b . . . 203n may have a first hardware configuration, while all computing devices 204a, 204b . . . 204n may have a second hardware configuration.

For example, the computing devices 203 may have a certain ratio of a first type of resource to a second type of resource, while the computing devices 204 may have a different ratio of the first type of resource to the second type of resource. In a specific example, the computing devices 203 may have a relatively high amount of memory, while the computing devices 204 may have a relatively high amount of CPU resources. In another specific example, the computing devices 203 may have a relatively high amount of CPU resources, while the computing devices 204 may have a relatively high amount of GPU resources. Although only two sets of computing devices 203 and 204 are shown, it is understood that there may be any number of sets of computing devices 203 and 204 having different hardware configurations.

As a non-limiting example, a customer who is planning to run a data store that will respond to a high volume of queries for small quantities of data may prefer to have a computing device 203, 204 with relatively high storage IOPS capability over storage bandwidth. By contrast, a customer who is planning to run an email archive may prefer to have a computing device 203, 204 with relatively high storage bandwidth capability over storage IOPS. The email archive may not respond to many requests, but when a request is received, a large quantity of bandwidth may be preferred to transfer data from the email archive.

Each computing device 203, 204 may execute one or more machine instances (MI). A machine instance may correspond to an actual machine or to a virtual machine. A virtual machine instance is a virtualized computer system, or a software implementation of a physical computing system. Virtual machines may provide for multiple and/or different operating system environments to run concurrently on a single system having a processor circuit and a memory. As a non-limiting example, multiple instances of a Linux® operating system environment may execute concurrently with multiple instances of a Microsoft® Windows® operating system environment on a single system. Each machine instance may be controlled by different customers, who may have administrative access only to their own instance(s) and not to the instances of other customers. Multiple machine instances may in fact execute concurrently on a computer system including parallel processors, although multiple instances may appear to execute concurrently on a multithreaded computer system with fewer processors than instances.

Different types of machine instances may be available. In the example of FIG. 2, computing devices 203 may support three types of machine instances: MI large 212, MI medium 215, and MI small 218, each of which may be associated with differing resource configurations. As a non-limiting example, each MI large 212 instance may have four CPU-equivalent units, 15 gigabytes (GB) of system memory, and 1,000 GB of data storage. Each MI medium 215 instance may have two CPU-equivalent units, 10 GB of system memory, and 103 GB of data storage. Also, each MI small 218 instance may have one CPU-equivalent unit, 5 GB of system memory, and 250 GB of data storage. In the example of FIG. 2, computing devices 204 may also support three types of machine instances, namely, MI large 221, MI medium 224, and MI small 227. MI large 221, MI medium 224, and MI small 227 may have the same respective configurations as MI large 212, MI medium 215, and MI small 218 or may have different configurations as desired. As a non-limiting example, a MI large 221 instance may have four CPU-equivalent units, 20 GB of system memory, and 1,000 GB of data storage.

The example of three types of machine instances for each type of computing device 203, 204 is not intended to be limiting. In various embodiments, there may be more or fewer types of machine instances for each type of computing device 203, 204. In various embodiments, the number and types of virtual machine instance configurations may be dynamically determined by the resource allocation service 124 (FIG. 1).

In the example of FIG. 2, one MI large 212 instance is executing on computing device 203a, two MI medium 215a, 215b instances are executing on computing device 203b, one MI medium 215c instance and two MI small 218a, 218b instances are executing on computing device 203n, one MI large 221 instance is executing on computing device 204a, three MI medium 224a, 224b, 224c instances are executing on computing device 204b, and one MI medium 224d instance and four MI small 227a, 227b, 227c, 227d instances are executing on computing device 204n. Each machine instance may be associated with a customer, though any customer may be associated with any number of machine instances.

Referring now to both FIGS. 1 and 2, a general description of the operation of the various components of the networked environment 100 is provided. To begin, customers at clients 109 submit resource allocation requests 127 to the resource allocation service 124 by way of a web-based interface or some other user interface. In some embodiments, the resource allocation service 124 may expose an application programming interface (API) so that resource allocation requests 127 may be submitted programmatically. In one embodiment, the resource allocation requests 127 may be generated automatically in the client 109 using such an API. The resource allocation requests 127 may be held in a request queue 157.

The resource allocation service 124 is configured to process the request queue 157 and fulfill the resource allocation requests 157 in the request queue 157 according to the available resources, thereby generating resource allocations 145. The resource allocations 145 may be late-binding, that is, the resource allocations 145 may stay in a pending state up until a threshold time before the availability time 142. Up until that time, the resource allocations 145 may be reallocated for resource allocation requests 127 having higher priorities or otherwise being a better fit.

To this end, the resource allocation service 124 may be configured to compute an internal priority 130 according to the allocation rules 151 based, for example, on customer-specified priorities 130, customer-associated internal priorities 130, resource specifications 133, location specifications 136, submission times 139, availability times 142, and so on. As a non-limiting example, resource allocation requests 127 that are submitted earliest may be given a higher internal priority 130 by the allocation rules 147. As another non-limiting example, resource allocation requests 127 that are needed urgently (i.e., have a nearest availability time 142 and a high customer-specified priority 130) may also be given a higher internal priority 130 by the allocation rules 137.

In various embodiments, an administrative user may be able to override priorities 130 and/or other data manually. As a non-limiting example, an anticipated shipment of computing hardware may be delayed, and it may be the case that hardware to fulfill one or more resource allocation requests 127 will not be shipped in time to meet the availability time 142. In such a case, the administrative user may be able to escalate the priority 130 of the resource allocation requests 127 manually to ensure that they are fulfilled, even with hardware that is not the best fit. To this end, the administrative user may interactively provide configuration data to override the priorities 130 and/or other aspects of the allocation process.

Various approaches may be employed to match resource allocation requests 127 with computing devices 103 and/or virtual machine instances in a resource-maximizing way. One particular approach involves modeling certain objects within the resource allocation service 124 in order to generate inputs to a maximization version of the generalized assignment problem. The problem may be described by the following: A pair (B, S) where B is a set of M bins (knapsacks) and S is a set of N items. Each bin $C_j$ in B has capacity c(j), and for each item i and bin $C_j$ we are given a size s(i, j) and a profit p(i, j). Find a subset U of S that has a feasible packing in B, such that the profit is maximized.

Regarding the subject matter of the present application, B may be the set of available computing devices 103 and virtual machine instances, S may be the set of resource allocation requests 127, (B, S) may represent the resource allocations 145, and the capacity may depend on the available computing capacity of the respective computing device 103. Size and profit may be defined in a variety of ways relating to, for example, computing capacity, internal priority associated with the resource allocation request 127, minimizing unused resources, minimizing unfulfilled high priority requests, minimizing unfulfilled requests in general, minimizing reallocations, and so on.

This problem is considered NP-complete, so it is difficult to solve in a reasonable amount of time for large data sets. According to various embodiments, any one of multiple approaches may be used in determining solutions to the generalized assignment problem. One example involves a brute-force method of trying all possible assignments, which may be possible for some data sets given adequate resources on the computing devices 106. Another example involves an approximation approach that reduces the computational complexity of the problem and produces a result that is an approximation to the solution, if not the actual solution. One particular example of such an approximation approach is described in a paper by Cohen et al., *An Efficient Approximation for the Generalized Assignment Problem*, Technion, Haifa, Israel, 2006 (hereinafter Cohen), which is incorporated herein by reference in its entirety as if it were fully produced herein.

Cohen describes an approximation approach that has a time complexity of $O(M \cdot f(N) + M \cdot N)$, wherein M is the number of computing devices 103 and/or virtual machine instances, N is the number of resource allocation requests 127, and $O(f(N))$ is the time complexity of an approximation approach for solving the knapsack problem. The knapsack problem is a similar problem that determines which of the resource allocation requests 127 can be allocated in one available computing device 103 or virtual machine instance so that the profit is maximized. The approach of Cohen guarantees a (1+α) approximation ratio, where α is the approximation ratio of an approach for solving the knapsack problem.

Other approaches may employ a more basic set of allocation rules 151. For example, the resource allocation requests 127 that are associated with a highest priority 130 may be allocated first. Then, the resource allocation requests 127 having a nearest availability time 142 may be allocated. If there is a conflict, the earliest submission time 139 may be used to determine which should be allocated first. Next, the resource allocation requests 127 may be allocated based at least in part on requested data center 118 and type of computing device 103 requested. Exact matches may be allocated first, followed by non-exact matches that are within a tolerance that is either customer-specified or enforced by the resource allocation service 127. The resource allocation service 127 may, according to the allocation rules 151, take into account spread within the data center 118 or rack 115, and/or other location specifications 136. Other approaches to resource allocation may be utilized in other embodiments.

In the case of allocating virtual machine instances, the configurations of the computing devices 103 for virtual machines may be predetermined or determined automatically. For example, various approaches may be used to determine virtual machine instance configurations automatically. This may be done, for example, by employing a so-called "P-median" solver that is adapted to obtain the optimum configurations of the virtual machine instances.

A P-median solver may be employed, for example, to locate fulfillment centers relative to customers. In such a scenario, there is a cost between each pairing between a customer and a fulfillment center given that there is a predefined number of fulfillment centers that an organization may wish to operate in a specific geographical area. A P-median solver may then be used to find an optimal location of fulfillment centers such that shipping costs to customers is minimized. Stated another way, for a given number of customers located at specific locations, a number of possible fulfillment centers, a fulfillment cost between each paired customer and fulfillment center, and given a total number of fulfillment centers one may wish to open, a P-median solver may be used to determine which fulfillment centers should be opened such that the overall fulfillment cost is minimized.

For example, let us consider a set $I=\{1 \ldots n\}$ of potential locations for p facilities, a set $J=\{1 \ldots m\}$ of customers, and n, m, matrix(g) of transportation costs for satisfying the demands of the customers from the facilities. The P-median problem is to locate the p facilities at locations of I in order to minimize the total transportation cost for satisfying the demand of the customers. Each customer is supplied from the closest open facility based upon the following equation:

$$F(S) = \sum_{j \in J} \min_{i \in S} g_{ij} \to \min_{S \subseteq I, |S|=p}$$

Given the foregoing, a P-median solver may also be employed to determine the optimal configurations of virtual machine instances for computing devices 103. Specifically, a P-median solver is set up in a similar way to that described above, except that the locations of customers are replaced with the requested computing capacities and/or other device parameters, the possible locations of the fulfillment centers are replaced by the possible computing capacities and/or other device parameters of the computing devices 103, and the cost of shipping between a given fulfillment center and a given customer is replaced by the empty space calculated by subtracting a requested computing capacity from the computing capacity of a computing device 103 times the quantity of resource requests.

The total number of fulfillment centers to be located is replaced by the total number of different virtual machine instance configurations that are to be used in the networked environment 100. Thus, by employing a P-median solver, the optimal capacities/configurations of computing devices 103 employed in a networked environment 100 may be determined.

After the resource allocations 145 are generated automatically by the resource allocation service 124, the resource allocations 145 may be finalized. When finalized, one or more automatic or manual tasks may be initiated in order to obtain, install, and/or configure the computing devices 103 for use by the customer. Various information may be provided to the customer at the client 109 relating to the resource allocations 145 of the customer. For example, computing device identifiers 169, login information, and/or other information may be provided in an email, text message, network page, or other form of communication.

Figure 3:
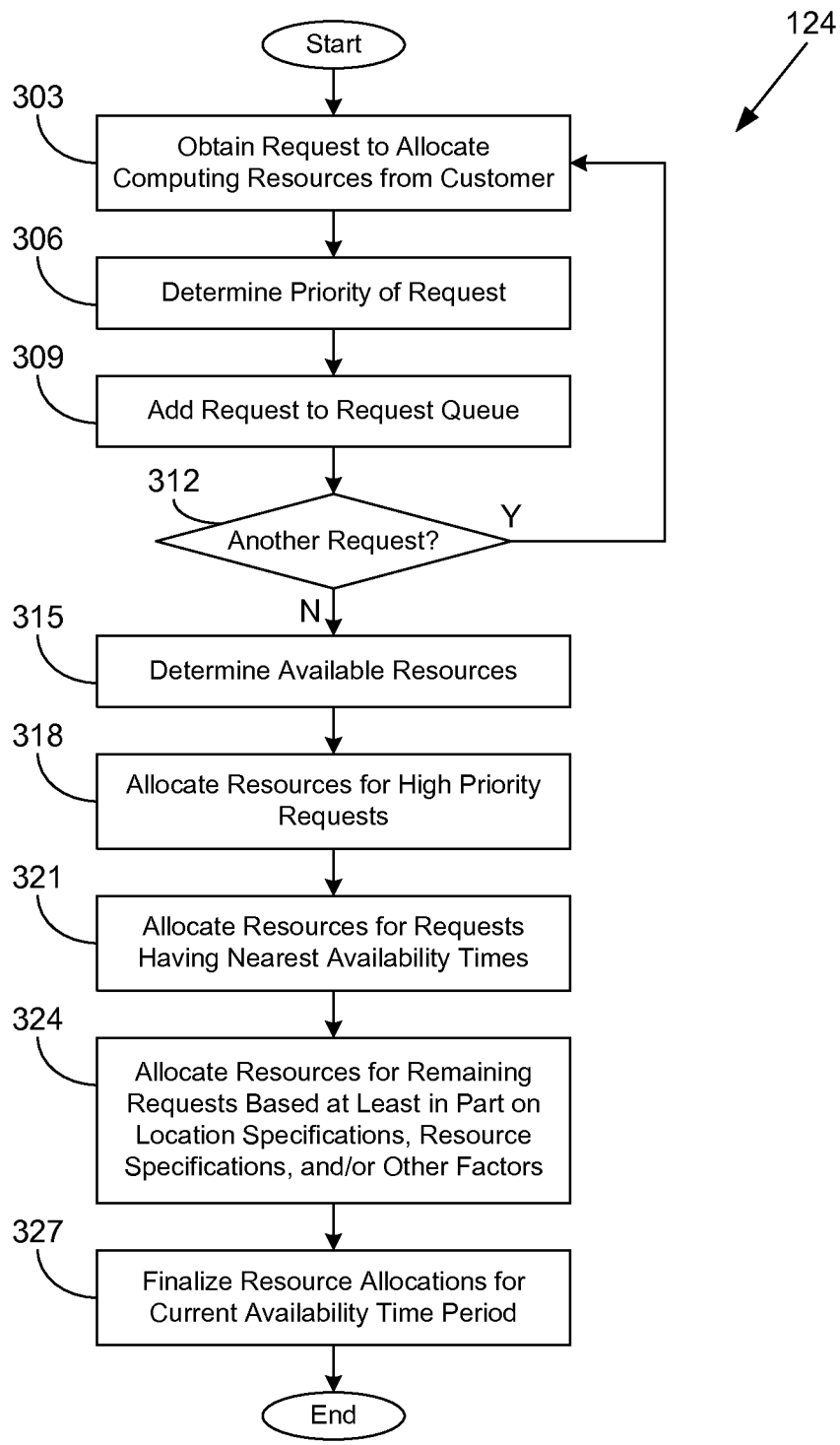
FIG. 3 is a flowchart illustrating one example of functionality implemented as portions of a resource allocation service executed in a computing device in the networked environment of FIG. 1 according to various embodiments of the present disclosure.

Turning now to FIG. 3, shown is a flowchart that provides one example of the operation of a portion of the resource allocation service 124 according to various embodiments. It is understood that the flowchart of FIG. 3 provides merely an example of the many different types of functional arrangements that may be employed to implement the operation of the portion of the resource allocation service 124 as described herein. As an alternative, the flowchart of FIG. 3 may be viewed as depicting an example of steps of a method implemented in the computing device 106 (FIG. 1) according to one or more embodiments.

Beginning with box 303, the resource allocation service 124 obtains a resource allocation request 127 (FIG. 1) from a customer at a client 109 (FIG. 1) to allocate computing resources. In one embodiment, the resource allocation service 124 may generate one or more network pages, such as web pages, etc., that provide a user interface for generating the resource allocation request 127. Such network pages may be rendered by the browser 181 (FIG. 1) on the display 178 (FIG. 1). In other embodiments, other types of interfaces may be used (e.g., command-line interfaces, automatic request generation interfaces, and so on).

In box 306, the resource allocation service 124 determines the priority 130 (FIG. 1) associated with the resource allocation request 127. The priority 130 may be specified by the customer in the resource allocation request 127 and/or computed by the resource allocation service 124 based, for example, on customer data 154 (FIG. 1), resource data 148 (FIG. 1), etc. As a non-limiting example, a customer may indicate a relatively high priority 130 for a resource allocation request 127 for allocating resources for an important service, and the resource allocation service 124 may assign a high priority 130 to the resource allocation request 127 due to the relative importance of the customer. In some cases, the resource allocation service 124 may modify or override a priority 130 established by the customer.

In box 309, the resource allocation service 124 adds the resource allocation request 127 to the request queue 157, which may be a priority queue. In box 312, the resource allocation service 124 determines whether another resource allocation request 127 remains to be processed and added to the request queue 157. If so, the resource allocation service 124 returns to box 303 and obtains another resource allocation request 127. If no other resource allocation request 127 remains to be processed, the resource allocation service 124 progresses from box 312 to box 315.

In box 315, the resource allocation service 124 determines the available resources (i.e., computing devices 103 (FIG. 1) and/or virtual machines) from the resource data 148 and the resource allocations 145 (FIG. 1) that may be used to fulfill the resource allocation request 127. In various embodiments, the resource allocation service 124 may consider computing hardware that is on order or can be ordered and/or capacity in a data center 118 to determine the available resources. In one embodiment, a P-median solver may be employed to determine the virtual machine instance configurations that are to be used in the computing devices 103. In box 318, the resource allocation service 124 allocates resources to satisfy high priority resource allocation requests 127 (e.g., those resource allocation requests 127 associated with a priority 130 that meets a minimum threshold). In box 321, the resource allocation service 124 allocates resources for resource allocation requests 127 having the nearest availability times 142. In other words, the resource allocation service 124 fulfills the resource allocation requests 127 that are most urgent.

In box 324, the resource allocation service 124 allocates resources for the remaining resource allocation requests 127 in the request queue 157 based at least in part on resource specifications 133 (FIG. 1), location specifications 136 (FIG. 1), and/or other factors such as submission time 139 (FIG. 1). Differing weights for the various factors may be applied in various embodiments according to the allocation rules 151 (FIG. 1). In one embodiment, a min/max approach may be used such that the greatest computing capacity requests are satisfied first, and so on, respecting the priorities 130 of the resource allocation requests 127. In another embodiment, an approach to solving the generalized assignment problem may be used to match up resource allocation requests 127 to computing devices 103 and/or virtual machine instances.

In box 327, the resource allocation service 124 finalizes the resource allocations 145 for the current availability time period. In other words, resource allocations 145 that are associated with availability times 142 within a threshold time of the current time are finalized. Consequently, computing devices 103 may be ordered, installed, and/or configured for the particular customer. The other resource allocations 145 may be held in a pending state, and may be reallocated for higher priority resource allocation requests 127 or resource allocation requests 127 that are otherwise a better fit. Thereafter, the portion of the resource allocation service 124 ends.

Figure 4:
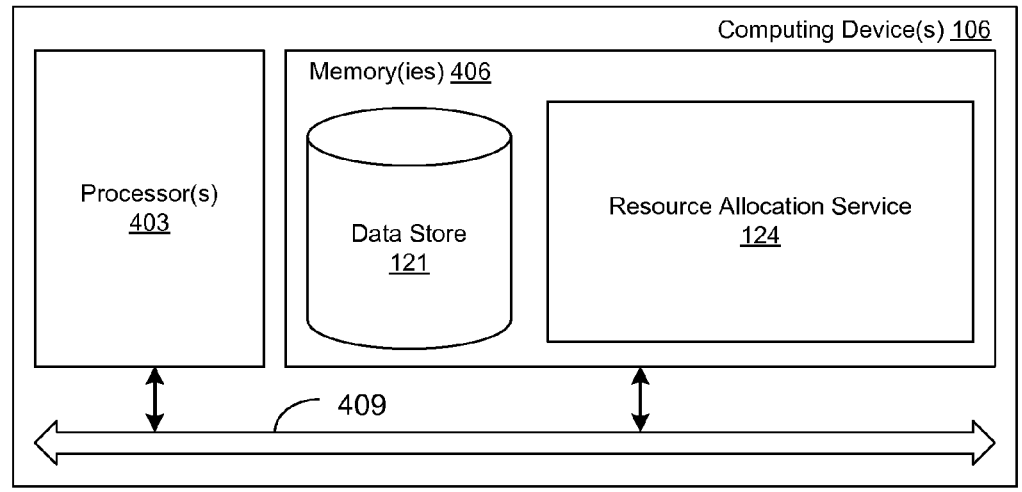
FIGS. 4 and 5 are schematic block diagrams that provide example illustrations of computing devices employed in the networked environment of FIG. 1 according to various embodiments of the present disclosure.

With reference to FIG. 4, shown is a schematic block diagram of the computing device 106 according to an embodiment of the present disclosure. The computing device 106 includes at least one processor circuit, for example, having a processor 403 and a memory 406, both of which are coupled to a local interface 409. To this end, the computing device 106 may comprise, for example, at least one server computer or like device. The local interface 409 may comprise, for example, a data bus with an accompanying address/control bus or other bus structure as can be appreciated.

Stored in the memory 406 are both data and several components that are executable by the processor 403. In particular, stored in the memory 406 and executable by the processor 403 are the resource allocation service 124 and potentially other applications. Also stored in the memory 406 may be a data store 121 and other data. In addition, an operating system may be stored in the memory 406 and executable by the processor 403.

Figure 5:
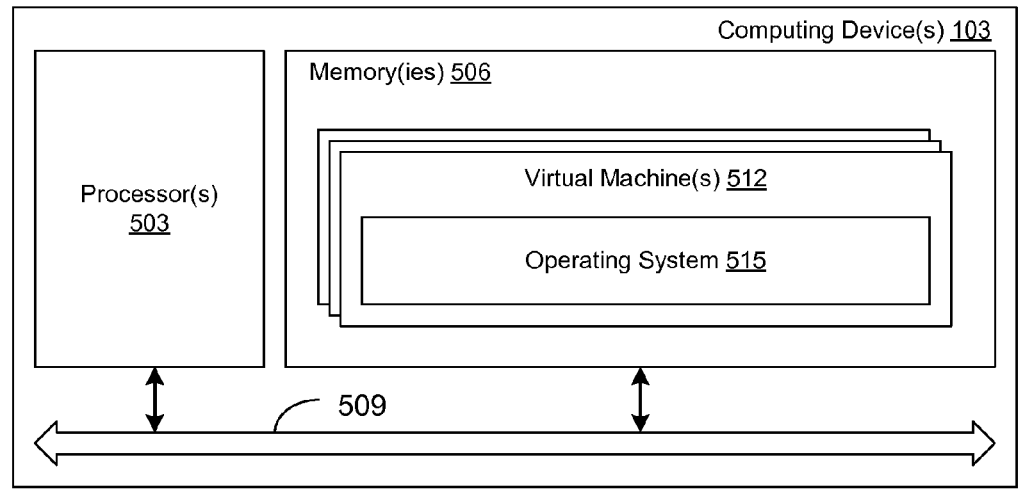

Turning now to FIG. 5, shown is a schematic block diagram of a computing device 103 according to an embodiment of the present disclosure. The computing device 103 may be representative of a computing device 203, 204 (FIG. 2). The computing device 103 includes at least one processor circuit, for example, having a processor 503 and a memory 506, both of which are coupled to a local interface 509. To this end, the computing device 103 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 may be one or more virtual machines 512 and potentially other applications. Each virtual machine 512 is representative of an instance of a virtual machine such as, for example, MI large 212, 221 (FIG. 2), etc., executing in the computing device 103. Each virtual machine 512 may include an operating system 515 executable in the virtual machine 512 and any number of other applications and data. In some cases, the computing device 103 does not include a virtual machine 512. In addition, an operating system may be stored in the memory 506 and executable by the processor 503.

With reference to both FIGS. 4 and 5, it is understood that there may be other applications that are stored in the memories 406, 506 and are executable by the processors 403, 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

A number of software components are stored in the memories 406, 506 and are executable by the processors 403, 503. In this respect, the term "executable" means a program file that is in a form that can ultimately be run by the processors 403, 503. Examples of executable programs may be, for example, a compiled program that can be translated into machine code in a format that can be loaded into a random access portion of the memories 406, 506 and run by the processors 403, 503, source code that may be expressed in proper format such as object code that is capable of being loaded into a random access portion of the memories 406, 506 and executed by the processors 403, 503, or source code that may be interpreted by another executable program to generate instructions in a random access portion of the memories 406, 506 to be executed by the processors 403, 503, etc. An executable program may be stored in any portion or component of the memories 406, 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memories 406, 506 are defined herein as including both volatile and nonvolatile memory and data storage components. Volatile components are those that do not retain data values upon loss of power. Nonvolatile components are those that retain data upon a loss of power. Thus, the memories 406, 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processors 403, 503 may represent multiple processors 403, 503 and the memories 406, 506 may represent multiple memories 406, 506 that operate in parallel processing circuits, respectively. In such a case, the local interfaces 409, 509 may be an appropriate network 112 (FIG. 1) that facilitates communication between any two of the multiple processors 403, 503, between any of the processors 403, 503 and any of the memories 406, 506, or between any two of the memories 406, 506, etc. The local interfaces 409, 509 may comprise additional systems designed to coordinate this communication, including, for example, performing load balancing. The processors 403, 503 may be of electrical or of some other available construction.

Although the resource allocation service 124, the virtual machines 512, and other various systems described herein may be embodied in software or code executed by general purpose hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowchart of FIG. 3 shows the functionality and operation of an implementation of one or more portions of the resource allocation service 124. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as processors 403, 503 in a computer system or other system. The machine code may be converted from the source code, etc. If embodied in hardware, each block may represent a circuit or a number of interconnected circuits to implement the specified logical function(s).

Although the flowchart of FIG. 3 shows a specific order of execution, it is understood that the order of execution may differ from that which is depicted. For example, the order of execution of two or more blocks may be scrambled relative to the order shown. Also, two or more blocks shown in succession in FIG. 3 may be executed concurrently or with partial concurrence. Further, in some embodiments, one or more of the blocks shown in FIG. 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the resource allocation service 124 and the virtual machines 612, that comprises software or code can be embodied in any non-transitory computer-readable medium for use by or in connection with an instruction execution system such as, for example, processors 403, 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in a computing device, the program comprising:

code that maintains a request queue including a plurality of requests from a plurality of customers for a plurality of computing resources, wherein individual ones of the requests are for allocating a respective computing resource for a respective customer, wherein individual ones of the requests are associated with a respective priority and a respective submission time, and wherein individual ones of the requests specify a respective requested availability time at which the respective computing resource is to be made available to the respective customer, a respective device parameter to select a type of computing device to provide the respective computing resource, and a respective location parameter to select a physical location in at least one data center where the respective computing resource is to be physically located;

code that allocates individual ones of the computing resources to individual ones of the customers in response to the requests based at least in part on at least one allocation rule, the respective priority, the respective submission time, the respective requested availability time, the respective device parameter, and the respective location parameter, wherein at least one of the computing resources is in a pending allocation state and may be reallocated to a different customer until a threshold time relative to the respective requested availability time;

code that adds another request for allocating a computing resource for a first customer to the request queue; and code that reallocates at least one of the computing resources from a second customer to the first customer in response to the other request.

2. The non-transitory computer-readable medium of claim 1, wherein the code that allocates is configured to allocate the computing resources based at least in part on an algorithm for solving a generalized assignment problem that is a first approximation algorithm having a time complexity of $O(M \cdot f(N)+M \cdot N)$, wherein N is number of requests, M is a number of computing devices having available capacity, and $O(f(N))$ is the time complexity of a second approximation algorithm for solving a knapsack problem.

3. The non-transitory computer-readable medium of claim 1, wherein the program further comprises code that determines a plurality of virtual machine instance configurations using a P-median solver based at least in part on a plurality of possible virtual machine instance configurations and the respective device parameter of at least one of the requests, wherein at least one of the computing resources is allocated according to one of the virtual machine instance configurations.

4. A system, comprising:
at least one computing device; and
a resource allocation service executable in the at least one computing device, the resource allocation service comprising:
logic that obtains a plurality of requests from a plurality of customers for a plurality of computing resources, wherein individual ones of the requests are for allocating a respective computing resource for a respective customer, wherein individual ones of the requests specify a respective requested availability time at which the respective computing resource is to be made available to the respective customer, a respective device parameter to select a type of computing device to provide the respective computing resource, and a respective physical location parameter to select a location in at least one data center where the respective computing resource is to be physically located;
logic that allocates individual ones of the computing resources to individual ones of the customers in response to the requests based at least in part on the respective requested availability time, the respective device parameter, the respective physical location parameter, and at least one allocation rule; and
wherein at least one of the computing resources is in a pending allocation state and may be reallocated to a different customer until a threshold time relative to the respective requested availability time.

5. The system of claim 4, wherein a first at least one of the computing resources is allocated on a first type of computing device, and a second at least one of the computing resources is allocated on a second type of computing device.

6. The system of claim 4, wherein at least one of the computing resources is a server computing device physically located in the at least one data center.

7. The system of claim 4, wherein at least one of the computing resources corresponds to a virtual machine instance.

8. The system of claim 4, wherein individual ones of the requests specify a respective priority, and wherein the logic that allocates is further configured to allocate individual ones of the computing resources based at least in part on the respective priority, and wherein the respective priority is given a greater weight than the respective device parameter and the respective physical location parameter by the at least one allocation rule.

9. The system of claim 8, wherein the resource allocation service further comprises logic that overrides the respective priority of at least one of the requests based at least in part on data obtained from an administrative user.

10. The system of claim 4, wherein at least one of the requests is associated with a parameter that indicates a predicted memory/processor usage pattern for the respective computing resource by the respective customer.

11. The system of claim 4, wherein the respective physical location parameter for at least one of the requests specifies the at least one data center for hosting the respective computing resource.

12. The system of claim 4, wherein the respective physical location parameter for at least one of the requests specifies a minimum distance between the respective computing resource and at least one other computing resource allocated to the respective customer in the at least one data center.

13. The system of claim 4, wherein the respective physical location parameter for at least one of the requests specifies a maximum distance between the respective computing resource and at least one other computing resource allocated to the respective customer in the at least one data center.

14. The system of claim 4, wherein the respective physical location parameter for at least one of the requests specifies a distribution among the at least one data center for the respective computing resource and at least one other computing resource allocated to the respective customer.

15. The system of claim 4, wherein the respective device parameter for at least one of the requests specifies a minimum data storage quantity for the respective computing resource.

16. The system of claim 4, wherein the logic that allocates is configured to allocate the computing resources based at least in part on an algorithm for solving a generalized assignment problem.

17. The system of claim 16, wherein the algorithm is an approximation algorithm having a time complexity of $O(M \cdot f(N)+M \cdot N)$, wherein N is a number of requests, M is a number of computing devices having available capacity, and $O(f(N))$ is the time complexity of an approximation algorithm for solving a knapsack problem.

18. A method, comprising:
maintaining, in at least one computing device, a request queue including a plurality of requests from a plurality of customers for a plurality of computing resources, wherein individual ones of the requests are for allocating a respective computing resource for a respective customer, wherein individual ones of the requests specify a respective requested availability time at which the respective computing resource is to be made available to the respective customer and a respective device parameter to select a type of computing device to provide the respective computing resource;
allocating, in the at least one computing device, individual ones of the computing resources to individual ones of the customers in response to the requests based at least in part on the respective requested availability time, the respective device parameter, and at least one allocation rule;
adding, in the at least one computing device, another request for allocating a computing resource for a first customer to the request queue; and reallocating, in the at least one computing device, at least one computing resource from a second customer to the first customer in response to the other request.

19. The method of claim 18, wherein the at least one allocation rule specifies a first weight to be given to the respective requested availability time and a second weight to be given to the respective device parameter.

20. The method of claim 18, wherein the computing resources are allocated to the customers in response to the requests based at least in part on a plurality of submission times associated with the requests.

21. The method of claim 18, wherein at least one of the requests specifies a respective location parameter to select a physical location of the respective computing resource.

22. The method of claim 21, wherein the respective location parameter indicates a requested one of a plurality of computing clusters.

23. The method of claim 18, wherein the respective device parameter for at least one of the requests is configured to select a virtual machine instance configuration to provide the respective computing resource.

24. The method of claim 18, further comprising determining, in the at least one computing device, a plurality of virtual machine instance configurations using a P-median solver based at least in part on a plurality of possible virtual machine instance configurations and the respective device parameter of at least one of the requests.

25. The method of claim 21, wherein the respective location parameter of at least one of the requests specifies a rack location of the respective computing resource within at least one data center.

* * * * *